United States Patent [19]

Euler

[11] 4,025,725
[45] May 24, 1977

[54] TELECOMMUNICATION SWITCHING NETWORK HAVING A MULTISTAGE REVERSED TRUNKING SCHEME AND SWITCHING ON A FOUR WIRE BASIS

[75] Inventor: Karl Euler, Pullach, Germany

[73] Assignee: Siemens Aktiengesellschaft, Munich, Germany

[22] Filed: Nov. 10, 1975

[21] Appl. No.: 630,493

[30] Foreign Application Priority Data

Nov. 14, 1974 Germany .......................... 2454144

[52] U.S. Cl. .......................................... 179/15 AT
[51] Int. Cl.² ....................................... H04Q 11/04
[58] Field of Search .................. 179/15 AT, 15 AQ

[56] References Cited
UNITED STATES PATENTS 3,878,338   4/1975   Hardy .......................... 179/15 AT Primary Examiner—Thomas W. Brown
Attorney, Agent, or Firm—Gerald L. Lett

[57] ABSTRACT

A telecommunication switching network is described which uses a multistage reverse trunking arrangement for switching single channel subscriber lines on a four wire basis. The switching network is constructed as a pulse code modulated (PCM) time division multiplex (TDM) network. A termination circuit is connected to each subscriber line, and at its output, to a TDM trunk. A switching module is provided for a group of such termination circuits; the module includes a multiplexer and a demultiplexer. Each of the aforementioned TDM trunks is connected at one end to the input of a multiplexer and at the other end to the output of the demultiplexer. An addressable storage for time position conversion is provided in the switching module. The input of the storage is connected to the output of the multiplexer, and its output is connected to the input of the demultiplexer. The other multiplexer inputs and demultiplexer outputs are connected by further TDM trunks to another switching network module of a succeeding stage.

2 Claims, 1 Drawing Figure

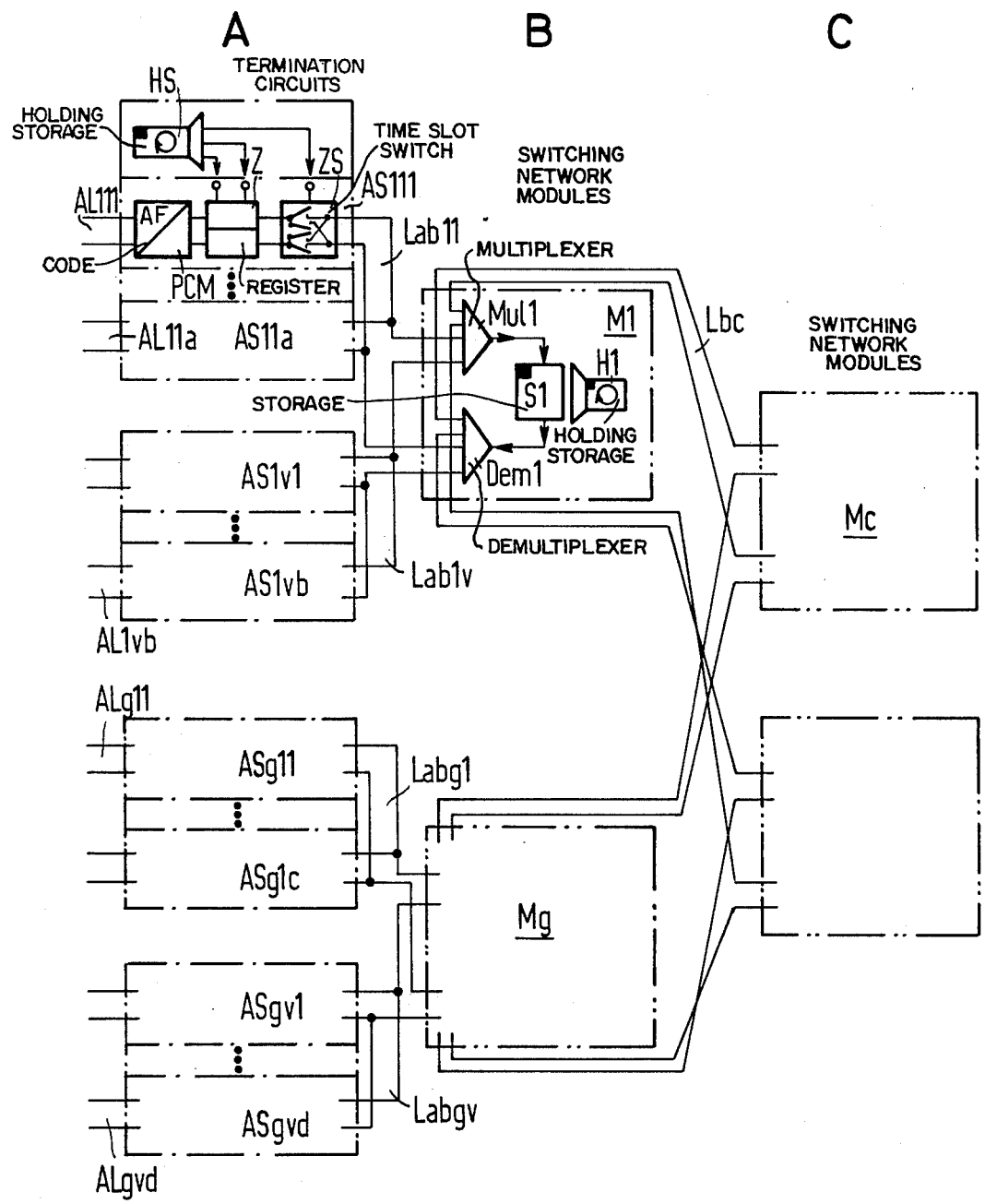

TELECOMMUNICATION SWITCHING NETWORK HAVING A MULTISTAGE REVERSED TRUNKING SCHEME AND SWITCHING ON A FOUR WIRE BASIS

BACKGROUND OF THE INVENTION

In centrally controlled telecommunication switching systems, more particularly telephone switching systems, subscriber lines and/or interexchange trunks from or to switching centers are interconnected by switching elements (crosspoints) forming in their entirety a switching network in accordance with the connections desired in each case. The arrangement of the switching elements within the switching network likewise, is referred to as the trunking scheme of the latter.

Among the possible trunking schemes of telecommunication switching systems various types can be distinguished, e.g., switching networks with stage-by-stage call buildup, which are divided into several ranks of selectors and in which during (stage-by-stage) call buildup only the possible paths within the rank of selectors currently being reached are taken into account, or switching networks with conjugate selection in which for a call buildup always the busy/idle status of the whole switching network is taken into account.

In the case of switching networks with conjugate selection a distinction can be made between two types of switching networks. The first uses an elongated trunking scheme, in which on two sides of the switching network there are disposed two groups of terminals, and connections are possible only between one terminal of one side and one terminal of the other side. The second is a switching network using a reversed trunking scheme, in which all terminals are located on the same side of the switching network. Such switching networks with the reversed trunking scheme are disclosed, for example, in Reports on Telephone Engineering VI (1970) 1/2, published by Siemens A. G., Berlin and Munich, West Germany, pp. 28–33 and 65–73, (cf. British Pat. No. 1,058,893), have the advantage of practically full availability to the outgoing lines, a high flexibility with respect to different conditions of compatibility and a far-reaching modular structure.

With regard, however, to the individual components of prior art space-division switching networks with reversed trunking scheme and crosspoints formed by dry reed contacts in metal enclosures these cannot be made by the increasingly popular large-scale integration techniques. Difficulties are encountered in this form of construction with the so-called pin limitation, i.e., limitation in function by limitation in available pin space, excessive heating, and technological limits which possibly allow the placing of, e.g., a matrix with 4 ... 16 crosspoints, on a single component in medium-scale integration.

It is an object of the invention to provide a form of construction for such networks exploiting the promising possibilities of large-scale integration for a switching network using the reversed trunking scheme, whereby several hundred switches can easily be placed on a single component.

SUMMARY OF THE INVENTION

According to the principles of the invention the foregoing and other objects are achieved in a switching network characterized in that it is constructed as a pulse code modulation (PCM) time-division multiplex (TDM) switching network in which the first switching stage is formed by groups and subgroups of termination circuits each individually allocated to an audio frequency subscriber line and having a PCM Codec with a PCM word register and a time slot switch. Each of the termination circuits is connected to a TDM trunk associated with the subgroup concerned.

Each of the TDM trunks is connected to an input of a multiplexer associated with a given group and to an output of a demultiplexer of a switching network module with a storage. The latter is connected directly, or over a switching matrix connecting a plurality of multiplexers/demultiplexers to a plurality of storages, at its input, to the output of the multiplexer and at its output to the input of the demultiplexer. It is addressable for the time-position conversion. To other inputs of the multiplexer and outputs of the demultiplexer there are connected TDM links which are connected to other inputs of the multiplexer and outputs of the demultiplexer which are likewise connected to an input of a multiplexer and to an output of a demultiplexer of a switching network module of another switching network module stage.

The invention has the advantage that the switching network can be realized using metal oxide semiconductor (MOS) large scale integration components, while preserving the propitious traffic characteristics of a switching network with reversed trunking scheme. At the same time, all the advantages known for PCM time division multiplex switching networks (such as a simpler and more economical crosspoint that needs to operate on digital signals only) and the substantially smaller number of crosspoints per line unit can also be taken advantage of.

BRIEF DESCRIPTION OF THE DRAWING

The invention will now be discussed with reference to a description of a preferred embodiment and the accompanying drawing. The single FIGURE drawing is a schematic diagram of a preferred embodiment of a switching network built in accordance with the principles of the invention.

DETAILED DESCRIPTION OF A PREFERRED EMBODIMENT

The switching network shown herein is one having a multistage reversed trunking scheme for single channel subscriber lines AL111 ... AL$gvd$ which are connectible to the first switching network A and divided into groups and subgroups by the switching network trunking. The sizes of the groups and subgroups can be chosen in accordance with the traffic intensity on the individual lines.

In the case of single channel subscriber lines AL111 ... AL$gvd$, they may be four wire, audio frequency subscriber lines which, in some cases, may also be connected over a hybrid circuit, such as disclosed, e.g., in U.S. patent application Ser. No. 495,801, now U.S. Pat. No. 3,955,053, corresponding to West German Offenlegungsschrift 2 148 929, to a two wire audio frequency subscriber line.

The switching network is constructed as a PCM time division multiplex network in which the first switching stage A is formed by a number of termination circuits AS corresponding to the number of audio frequency subscriber lines AL connected to the switching network.

The termination circuits AS are each individually associated with an audio frequency subscriber line AL and have a PCM Codec AF/PCM, i.e., an analog to digital converter for converting audio frequency to PCM signals, a PCM word register Z and a time slot switch ZS, as detailed in the drawing for the termination circuit AS111. As shown in the drawing for the termination circuit AS111, the time slot switch ZS is built like a cross switch to enable, if necessary, a conductor crossing for error-free switching.

The PCM Codec AF/PCM contained in the termination circuit may be constructed in a manner in itself known. By way of example, a PCM Codec with a PCM word register is shown in U.S. patent application Ser. No. 483,144, now U.S. Pat. No. 3,993,992, corresponding to West German Offenlegungsschrift 2 333 298, as well as IBM Technical Disclosure Bulletin, Volume 10, No. 9, February 1968, pp. 1372–1373.

In the drawing it is indicated for the termination circuit AS111 that the PCM word register associated with the PCM Codec AF/PCM and the time slot switch ZS can be activated at the proper time from what is known as a holding set HS in the form of a circulating storage and a subsequently connected signal decoder in accordance with the time position allocated to the connection concerned. Each termination circuit may have such a holding set or a holding set may also be shared by a whole subgroup of termination circuits that enables the simultaneous activation of two termination circuits.

The termination circuits forming a subgroup are each connected to a four wire TDM trunk associated with that subgroup. Thus, for example, in the PCM time-division multiplex switching network shown in the drawing the termination circuits AS111 . . . AS11a are connected to the TDM trunk Lab11 and the termination circuits AS1v1 . . . AS1vb are connected to the TDM trunk Lab1v, termination circuits ASg11 . . . ASg1c are connected to TDM trunk Labg1, and termination circuits ASgv1 . . . ASgvd are connected to TDM trunk Labgv.

Each of the four wire TDM trunks Lab11 . . . Labgv is connected to an input of a multiplexer associated with a given group of termination circuits AS111 . . . ASgvd and to an output of a switching network module of the second switching network B associated with that group. Thus, the switching network module has a storage which is addressable for time position conversion, and is connected at its input to the output of the multiplexer and at its output to the input of the demultiplexer directly, or via a switching matrix connecting a plurality of multiplexers/demultiplexers to a plurality of storages. Thus, in the PCM time-division multiplex switching network shown in the drawing the TDM trunks Lab11 . . . Lab1v are connected to an input of a multiplexer Mu11 associated with the group of termination circuits AS111 . . . AS1vb and to an output of a demultiplexer Dem1 of a switching network module M1 associated with that group of termination circuits.

The switching network module M1 has a storage S1 connected on its input side to the output of multiplexer Mu11 and, on its output side, to the input of demultiplexer Dem1; this storage is selected for the time position conversion from a holding set H1. Similarly, in the switching network illustrated in the drawing the four-wire TDM trunks Labg1 . . . Labv are connected to a similarly constructed switching network module Mg. Such switching network modules are disclosed in the prior art. For example, FIG. 1 or FIG. 2 of U.S. Pat. No. 3,881,064 corresponding to West German Pat. No. 2 148 994 illustrates such a switching network module having a storage which is addressable for the time position conversion and connected, either directly or via a switching matrix connecting a plurality of multiplexers/demultiplexers to a plurality of storages, on the input side to the output of the multiplexer and on the output to the input of the demultiplexer.

To other inputs of multiplexer Mu11 and to outputs of demultiplexer Dem1 of switching network module M1, there are connected (four wire) further TDM links, such as TDM link Lbc. Such TDM links are similarly connected to switching network module Mg of the second switching stage B. These TDM links are likewise connected to an input of a multiplexer and to an output of a demultiplexer of a switching network module of another switching network module stage C. Thus, in the drawing it is indicated that, e.g., TDM link Lbc is connected in this way to a switching network module Mc of switching network module stage C.

The relevant connecting paths in the PCM time-division multiplex switching network illustrated in the drawing run in the manner as disclosed in the prior art for switching networks with the reversed trunking scheme. Subscriber lines which (e.g., subscriber lines AL111 and AL11a) are connected via their termination circuit (AS111 or AS11a) to one and the same TDM link (Lab11), i.e., which are associated with one and the same subgroup of subscriber lines, are interconnected via the TDM link (Lab11) concerned, i.e., on a short path running only within the first switching stage A, whereby the time slot switch of either termination circuit causes a conductor crossing for error-free switching. Subscriber lines which (e.g., subscriber lines AL111 and AL1vb) are associated with one and the same group, but not with one and the same subgroup, of subscriber lines are interconnected via the TDM links (Lab11 and Lab1v) associated with the subgroups concerned and over the switching network module (M1) of the second switching stage B associated with the group of subscriber lines concerned. Connections between two subscriber lines which (e.g., subscriber lines AL1vb and ALg11) are not associated with one and the same group of subscriber lines run over the associated TDM trunk (Lab1v or Labg1) to the associated switching network module (M1 or Mg) of the second switching stage B and from there further to a switching network module (e.g., Mc) of the third switching stage C, over the storage of which the TDM links utilized for the relevant connection are periodically interconnected at intervals allocated to that connection.

The principles of this invention are described herein by describing an exemplary and preferred embodiment constructed accordingly. It is contemplated that the described embodiment can be modified or changed in a variety of ways known to those skilled in the art without departing from the scope of the invention, as defined by the appended claims.

I claim:

1. A pulse code modulated (PCM), time division multiplex (TDM) telecommunication switching network having a multistage reverse trunking arrangement for switching single channel subscriber lines on a four wire basis, comprising:

a plurality of subscriber lines, a first switching stage comprising a plurality of termination circuits, each connected to receive audio frequency analog signals from a said subscriber line and for converting those signals to pulse code modulated, time division multiplex signals, said termination circuits being formed into groups and sub-groups, a second switching stage comprising a plurality of switching modules, each said module being connected to outputs of a group of said termination circuits, each said switching module comprising a multiplexer, an addressable storage for time position conversion having its input connected to the multiplexer output and a demultiplexer having its input connected to the storage output, first TDM line means commonly connecting each said termination circuit in a sub-group to a said switching module, the output of each said termination circuit being connected to a multiplexer input and demultiplexer output of the said switching module assigned to that sub-group, a third switching stage comprising a plurality of switching modules, each module including a multiplexer and a demultiplexer and second TDM line means connecting other multiplexer inputs and demultiplexer outputs in each said switching module in said second switching stage to, respectively, multiplexer inputs and demultiplexer outputs in said switching modules in said third switching stage.

2. The telecommunication switching network defined in claim 1 wherein each said termination circuit comprises:

analog to digital converter means for converting said audio frequency signals to PCM signals, a PCM word register for receiving and storing said PCM signals and time switch means for connecting the contents of said PCM word register to the output of the termination circuit at predetermined times.

* * * * *